April 22, 1969 R. L. MILLER 3,440,414

ANTI-LOGARITHMIC COMPUTING CIRCUIT

Filed Dec. 14, 1964

INVENTOR.
ROBERT L. MILLER

BY Arthur H. Swanson

ATTORNEY

United States Patent Office 3,440,414
Patented Apr. 22, 1969

3,440,414
ANTI-LOGARITHMIC COMPUTING CIRCUIT

Robert L. Miller, Horsham, Pa., assignor to Honeywell Inc., Minneapolis, Minn., a corporation of Delaware Filed Dec. 14, 1964, Ser. No. 417,891
Int. Cl. G06g 7/24
U.S. Cl. 235—197 4 Claims

ABSTRACT OF THE DISCLOSURE

An input voltage whose anti-logarithm is to be computed is applied to a voltage controlled oscillator, which drives a switch at a frequency which is inversely proportional to the input voltage. The switch in one condition applies the input voltage to charge a capacitor through a resistor, and in its alternate condition discharges the capacitor. A capacitor charging current signal taken from the resistor is passed through an averaging filter to form an output voltage which is the anti-logarithm of the input voltage.

This invention relates to analog computing circuits. More specifically, the present invention relates to logarithmic amplifiers.

An object of the present invention is to provide an improved logarithmic amplifier.

Another object of the present invention is to provide an improved feedback amplifier having a logarithmic amplifying characteristic.

A further object of the present invention is to provide an improved analog computing circuit having an output signal which is the anti-logarithm of an input signal thereto.

A still further object of the present invention is to provide a logarithmic amplifier having an anti-logarithmic feedback circuit.

Still another object of the present invention is to provide an improved logarithmic amplifier, as set forth herein, having a simple operation and construction.

In accomplishing these and other objects, there has been provided in accordance with the present invention, a logarithmic amplifier having an operational amplifier having an anti-logarithmic feedback circuit. The feedback circuit includes a voltage-controlled oscillator which is arranged to drive a single pole, double-throw switch. A capacitor is connected to the moving contact of the switch and is alternately connected to an input circuit of the feedback circuit and an output circuit of the feedback circuit and to a capacitor discharging circuit. The capacitor is, thus, alternately charged by the input circuit, with a charging signal which appears on the output circuit, and discharged by the discharging circuit. The discharging of the capacitor is effective to prepare it for the next charging operation.

A better understanding of the present invention may be had when the following detailed description is read in connection with the accompanying drawings, in which.

Figure 1:
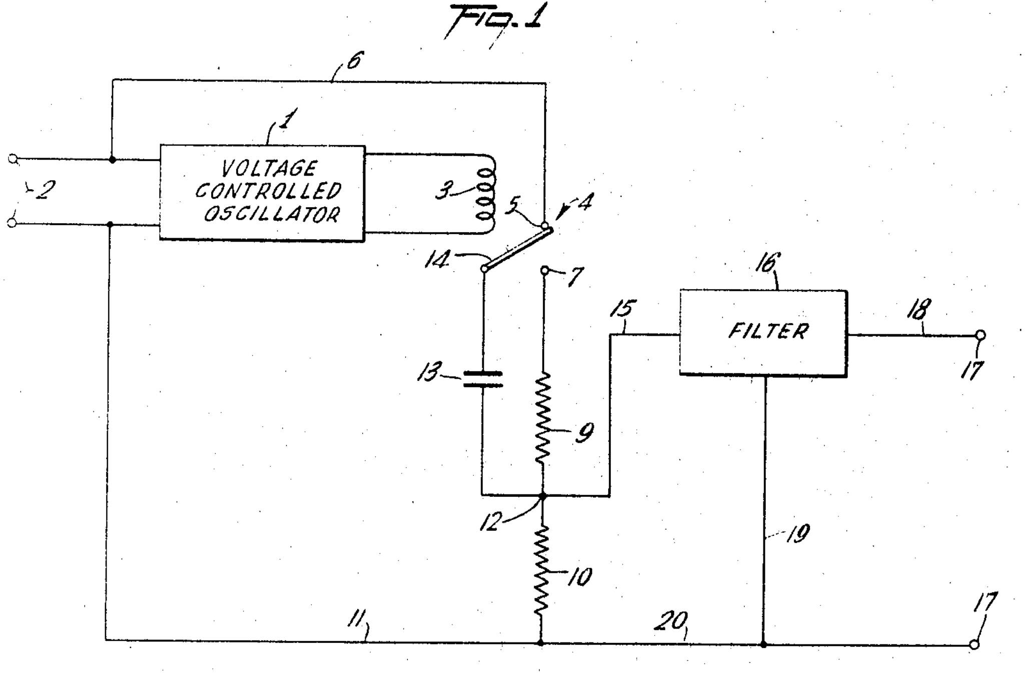
FIG. 1 is a schematic illustration of an anti-logarithmic circuit embodying the present invention.

Referring to FIG. 1 in more detail there is shown an analog computing circuit embodying the present invention. A voltage-controlled oscillator 1 is arranged to respond to an input signal applied to input terminals 2. The oscillator 1 is effective to produce a variable frequency output signal having a frequency inversely proportional to the magnitude of the input signal. This output signal is applied to a driving coil 3 of a signal chopper

4; i.e., a single pole, double-throw switch. A fixed contact 5 of the chopper 4 is connected by line 6 to one of the input terminals 2. The other fixed chopper contact 7 is connected to the other one of the input terminals 2 through a pair of series-connected resistors 9 and 10 and return line 11. The junction 12 between the resistors 9 and 10 is connected by a capacitor 13 to the chopper armature 14. The junction 12 is also connected by line 15 to the input circuit of a signal filter 16. The output circuit of the filter 16 is connected to a pair of output terminals 17 by output lines 18 and 19. One of the output terminals is connected by a line 20 to the line 11 and, consequently, back to one of the input terminals 2.

In operation, the anti-logarithmic circuit of the present invention shown in FIG. 1 is arranged to apply input signals from the input terminals 2 to the voltage-controlled oscillator 1. The oscillator 1 is effective to provide an output signal to the chopper driving coil 3 having a frequency inversely dependent on the magnitude of the applied input signal. Thus, the speed of operation, or period, of the chopper 4 is determined by the input signal magnitude.

The input signal appearing at the terminals 2 is also applied to the capacitor 13 when the movable contact 14 of the chopper 4 is in the position shown in FIG. 1. Thus, the input signal path to the capacitor 13 is over line 6, fixed contact 5, movable contact 14 to capacitor 13 and return through resistor 10 and return line 11. The capacitor 13 is, thus exponentially charged through resistor 10 toward the magnitude of the input signal during the time that contact 14 is joined to contact 5. The signal appearing across resistor 10 during the charging of capacitor 13 is also applied over line 15 to the output filter 16.

When the chopper 4 is subsequently energized to drive the contact 14 against the contact 7, the capacitor 13 is discharged through resistor 9. The filter 16 is effective to smooth the waveshape of the signal applied thereto befor applying it to the output terminals 17. The capacitor 13, accordingly, is periodically charged toward the input signal through resistor 10 and is discharged through resistor 9. Resistor 9 is arranged to fully discharge the capacitor 13 while the time constant of resistor 10 and capacitor 13 is made greater than the period of the chopper 4 over the range of anticipated chopper frequency as determined by the output signal from the oscillator 1. Thus, the signal appearing between the output terminals 17 is the average signal produced by the charging of capacitor 13.

The operation of the circuit shown in FIG. 1 may be expressed as follows.

Let:

V be the input signal between the terminals 2,
E be the output signal between the terminals 17,
R be the resistance of the resistor 10,
C be the capacitance of the capacitor 13, and
2T be the period of the chopper 4.

Then:

$$E=\frac{1}{2T}\int_0^T V\epsilon^{-\frac{t}{RC}}dt \tag{1}$$

Integrating Equation 1 gives:

$$E=-\frac{RC}{2T}\left[V\epsilon^{-\frac{t}{RC}}\right]_0^T \tag{2}$$

Putting in the limits in Equation 2 gives:

$$E=-\frac{RCV}{2T}\left[\epsilon^{-\frac{T}{RC}}-1\right] \tag{3}$$

But from column 2, lines 17 through 20:

$$T \propto V \qquad (4)$$

Then let:

$$T = -KV \qquad (5)$$

where —K is a constant.

Substituting Equation 5 into Equation 3 gives:

$$E = \frac{RCV}{2KV}\left[\epsilon^{\frac{KV}{RC}} - 1\right] \qquad (6)$$

Rearranging Equation 6 gives:

$$E + \frac{RC}{2K} = \frac{RC}{2K}\epsilon^{\frac{KV}{RC}} \qquad (7)$$

Multiplying both sides of Equation 7 by $2K/RC$ gives:

$$\frac{2K}{RC}E + 1 = \epsilon^{\frac{KV}{RC}} \qquad (8)$$

Since K, R, and C are constants, Equation 8 can be written:

$$E \propto \epsilon^{V} \qquad (9)$$

This shows that E is proportional to the anti-logarithm of V.

Since the constant terms can be eliminated or calibrated out by suitable techniques, it is seen that the output signal E between the terminals 17 is the anti-logarithm of the input signal V between the terminals 2.

Figure 2:
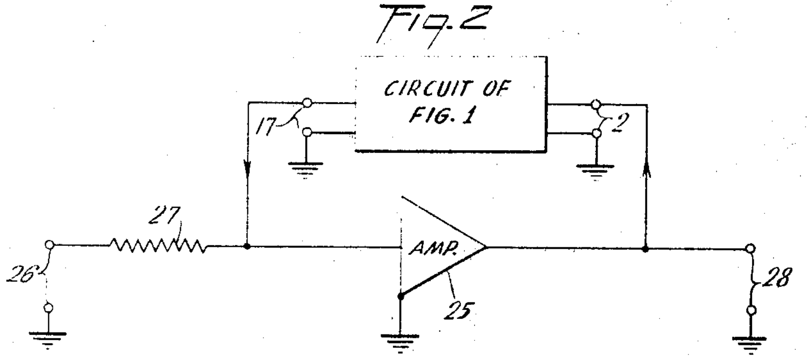
FIG. 2 is a schematic illustration of a logarithmic amplifier using a feedback circuit comprising the circuit shown in FIG. 1.

In FIG. 2, there is shown a logarithmic amplifier using the present invention. The circuit shown in FIG. 1 is connected in the feedback loop of an operational amplifier 25. A pair of input terminals 26 are arranged to be connected to a source of input signals. The input terminals 26 are connected through an input resistor 27 to the input circuit of the amplifier 25. The output signal from the amplifier 25 is connected to a pair of output terminals 28. The circuit of FIG. 1 is connected between the output circuit and the input circuit of the amplifier 25. Specifically, the input terminals 2 of the circuit of FIG. 1 are connected across the output terminals 28 while the output terminals 17 are connected to the input circuit of the amplifier 25. The output signal from the amplifier 25, thus, is connected to the input circuit of the amplifier 25 in a typical operational amplifier feedback operation to a summing junction along with the input signal applied to the input terminals 26.

However, the feedback circuit comprises the anti-logarithmic circuit of FIG. 1. Thus, the feedback signal is the anti-logarithm of the output signal from the amplifier 25. Since the summing operation of the feedback signal and the input signal is arranged in operational amplifier fasihon to provide a subtraction of the signals at the summing junction, the input signal to the amplifier 25 is the difference between the summed signals. The output signal from the amplifier 25 will increase until the difference signal is, in theory, reduced to a zero magnitude. The feedback signal which is the anti-logarithm of the output signal from the amplifier 25 is then equal to the input signal appearing at the summing junction. However, the output signal from the amplifier 25 which is used to provide this feedback signal is the logarithm of the input signal at the input terminals 26 since the anti-logarithm of the logarithmic signal results in the formation of the original signal. Thus, the output signal appearing at the output terminals 28 is the logarithm of the input signal applied to input terminals 26.

This logarithmic representation may be used for further analog computation; e.g., dividing the signal in half provides the square root in logarithmic form of the input signal while multiplying and dividing operations are reduced to addition and subtraction, respectively. The final computed result may then be passed through the circuit of FIG. 1 to take the anti-logarithm of the computed signal and supply a signal having the computed relationship to the initial input signal; e.g., the square root of the input signal.

Accordingly, it may be seen that there has been provided, in accordance with the present invention, a feedback logarithmic amplifier having an anti-logarithmic computing circuit in the amplifier feedback network.

What is claimed is:

1. An anti-logarithmic computing circuit comprising a voltage to frequency converter having an output signal with a variable frequency inversely proportional to the magnitude of an input signal thereto, switch means arranged to be energized by said output signal, a signal storage means, discharge means for said signal storage means, said switch means being connected to said discharge means, said storage means and said input signal to said converter and operative to sequentially and alternately connect said storage to said input signal and to said discharge means and computing circuit output means connected to said storage means to sense a charging signal for said storage means.

2. An anti-logarithmic computing circuit comprising a voltage to frequency converter having an output signal with a variable frequency inversely proportional to the magnitude of an input signal thereto, a single-pole, double-throw switch means, driving means for said switch arranged to be energized by said output signal, a pair of input terminals, input circuit means connecting an input signal applied to said input terminals to said computing circuit as an input signal to said converter and a first one of said terminals to one pole-receiving side of said switch, a signal storage means connected to said pole of said switch, a signal storage discharge means connected between the other pole-receiving side of said switch and a second one of said input terminals whereby said storage means is sequentially and alternatively connected to said input terminals and to said discharge means, and computing circuit output means connected to said storage means to sense a charging signal for said storage means.

3. An anti-logarithmic computing circuit as set forth in claim 2 wherein said storage means comprises a series connection of a capacitor and a resistor and said output means is connected across said resistor.

4. An anti-logarithmic computing circuit as set forth in claim 3 wherein said discharge means comprises a resistor having a value operative to substantially fully discharge said storage means between connections of said storage means to said input terminals.

References Cited

UNITED STATES PATENTS

| | | | |
|---|---|---|---|
| 2,496,723 | 2/1950 | Hipple | 328—145 X |
| 2,868,968 | 1/1959 | Rich | 328—145 X |
| 3,108,197 | 10/1963 | Levin | 307—88.5 |
| 3,237,028 | 2/1966 | Gibbons | 307—88.5 |

MALCOLM A. MORRISON, *Primary Examiner.*

FELIX D. GRUBER, *Assistant Examiner.*

U.S. Cl. X.R.

328—145